(12) United States Patent
Zhou

(10) Patent No.: US 11,089,259 B2
(45) Date of Patent: Aug. 10, 2021

(54) VIDEO RECORDING METHOD AND VIDEO RECORDING TERMINAL

(71) Applicant: GUANGZHOU BAIGUOYUAN INFORMATION TECHNOLOGY CO., LTD., Guangzhou (CN)

(72) Inventor: Yutao Zhou, Guangzhou (CN)

(73) Assignee: Bigo Technology Pte. Ltd., Mapletree Business (SG)

(*) Notice: Subject to any disclaimer, the term of this patent is extended or adjusted under 35 U.S.C. 154(b) by 0 days.

(21) Appl. No.: 16/764,958

(22) PCT Filed: Nov. 30, 2018

(86) PCT No.: PCT/CN2018/118380
§ 371 (c)(1),
(2) Date: May 18, 2020

(87) PCT Pub. No.: WO2019/105441
PCT Pub. Date: Jun. 6, 2019

(65) Prior Publication Data
US 2020/0351467 A1    Nov. 5, 2020

(30) Foreign Application Priority Data
Nov. 30, 2017 (CN) .......................... 201711236846.5

(51) Int. Cl.
*H04N 5/272* (2006.01)
*G11B 27/036* (2006.01)
(Continued)

(52) U.S. Cl.
CPC ........... *H04N 5/772* (2013.01); *G11B 27/036* (2013.01); *G11B 27/34* (2013.01); *H04N 5/23293* (2013.01); *H04N 5/272* (2013.01)

(58) Field of Classification Search
CPC .... H04N 5/772; H04N 5/272; H04N 5/23293; G11B 27/036; G11B 27/34
See application file for complete search history.

(56) References Cited

U.S. PATENT DOCUMENTS

2005/0264668 A1    12/2005  Miyamoto
2010/0142913 A1*   6/2010  Hasegawa ............ H04N 9/8042
                                                        386/278
(Continued)

FOREIGN PATENT DOCUMENTS

CN    103347155 A    10/2013
CN    103546698 A    1/2014
(Continued)

OTHER PUBLICATIONS

First office action of Chinese application No. 201711236846.5 dated Jul. 17, 2019.
(Continued)

*Primary Examiner* — Thai Q Tran
*Assistant Examiner* — Jose M Mesa
(74) *Attorney, Agent, or Firm* — Dilworth & Barrese, LLP.; Michael J. Musella, Esq.

(57) ABSTRACT

Provided in the present disclosure are a video recording method and a video recording terminal, the method including: recording a video in response to receipt of a record instruction, pausing the recording in response to receipt of a pause instruction, so as to generate a first video file; continuing to display a dynamic image which is being captured by an image sensor in real time, and displaying a last frame image of the first video file subjected to transparency processing on the dynamic image in a superimposition manner; continuing to record the video in response to receipt of a continue-to-record instruction, stopping the recording in response to receipt of a stop instruction, so as to generate a
(Continued)

second video file; and splicing the first video file and the second video file into a target video file.

20 Claims, 1 Drawing Sheet

(51) Int. Cl.
*G11B 27/34* (2006.01)
*H04N 5/77* (2006.01)
*H04N 5/232* (2006.01)

(56) References Cited

U.S. PATENT DOCUMENTS

| | | | |
|---|---|---|---|
| 2011/0044602 A1* | 2/2011 | Lim | H04N 5/76 386/224 |
| 2014/0152875 A1 | 6/2014 | Tobin et al. | |
| 2018/0233174 A1* | 8/2018 | Nakagawa | G11B 27/34 |

FOREIGN PATENT DOCUMENTS

| | | |
|---|---|---|
| CN | 103702041 A | 4/2014 |
| CN | 105245810 A | 1/2016 |
| CN | 105872700 A | 8/2016 |
| CN | 106210531 A | 12/2016 |
| CN | 107948562 A | 4/2018 |
| JP | 2002084488 A | 3/2002 |

OTHER PUBLICATIONS

Second office action of Chinese application No. 201711236846.5 dated Nov. 27, 2019.
Notification to grant patent right for invention of Chinese application No. 201711236846.5 dated Mar. 5, 2020.
Extended European search report of counterpart EP application No. 18884133.2 dated Jul. 9, 2020.
Communication pursuant to Article 94(3) EPC of counterpart EP application No. 18884133.2 dated Sep. 11, 2020.

* cited by examiner

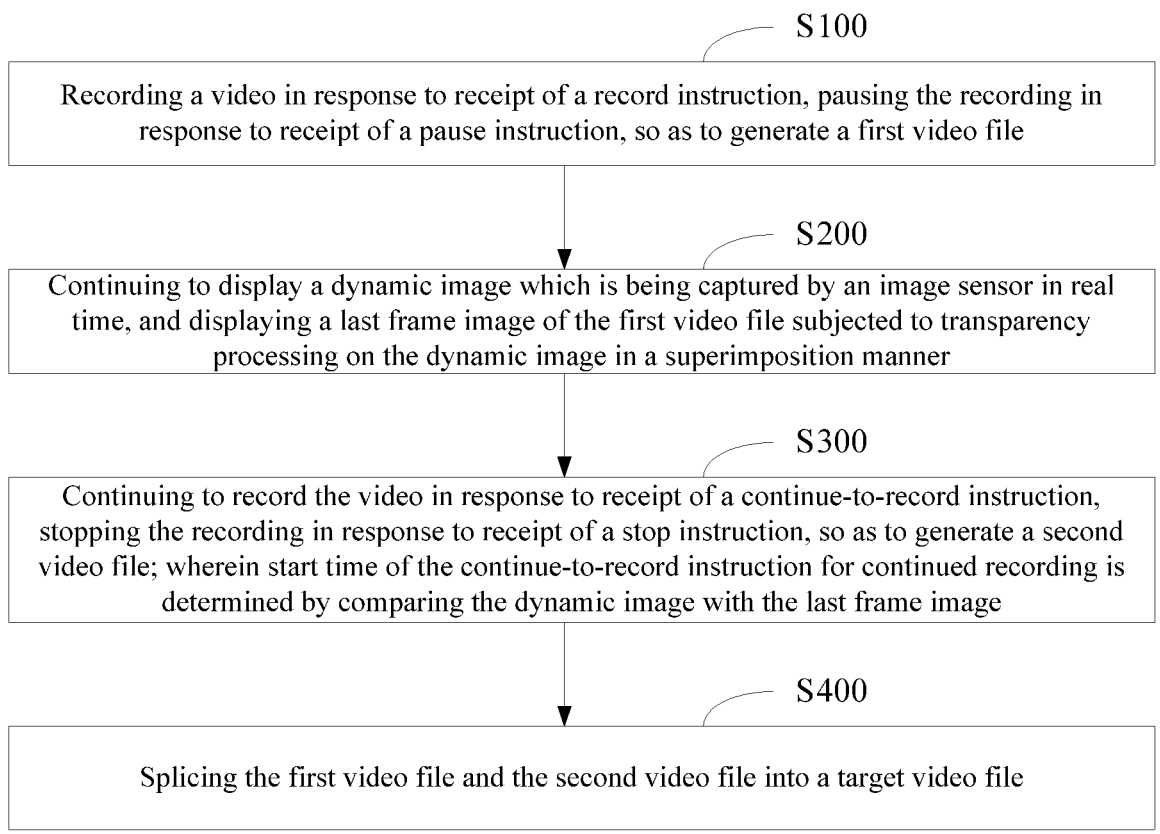

VIDEO RECORDING METHOD AND VIDEO RECORDING TERMINAL

CROSS-REFERENCE TO RELATED APPLICATION

The present application is a national phase application based on PCT/CN2018/118380, filed on Nov. 30, 2018, which claims priority to Chinese Patent Application No. 201711236846.5, filed on Nov. 30, 2017 and entitled "VIDEO RECORDING METHOD AND VIDEO RECORDING TERMINAL", which is incorporated herein by reference in its entirety.

TECHNICAL FIELD

The present disclosure relates to the technical field of video recording, and more particularly, relates to a video recording method and a video recording terminal.

BACKGROUND

With constant developments of the video technologies, various video sharing platforms have emerged for netizens to enjoy self-created videos uploaded thereto. Traditional video sharing platforms allow users to add various special effects to videos during recording the videos to make the self-created videos more interesting, and attract the netizens to click and enjoy them.

SUMMARY

The present disclosure provides a video recording method. The method includes following steps:

recording a video in response to receipt of a record instruction, pausing the recording in response to receipt of a pause instruction, so as to generate a first video file;

continuing to display a dynamic image which is being captured by an image sensor in real time, and displaying a last frame image of the first video file subjected to transparency processing on the dynamic image in a superimposition manner;

continuing to record the video in response to receipt of a continue-to-record instruction, stopping the recording in response to receipt of a stop instruction, so as to generate a second video file; wherein start time of the continue-to-record instruction for continued recording is determined by comparing the dynamic image with the last frame image; and splicing the first video file and the second video file into a target video file.

The present disclosure also provides a video recording terminal. The terminal includes:

a display;
one or more processors;
a memory; and
one or more applications stored in the memory, and configured to be executed by the one or more processors and to execute the video recording method as defined in any of the embodiments.

Additional aspects and advantages of the present disclosure are described in the following description, and become apparent from the following description or may be understood by practicing the present disclosure.

BRIEF DESCRIPTION OF THE DRAWINGS

The above and/or additional aspects and advantages of the present disclosure may become apparent and easily understood from the following description of the embodiments with reference to the accompanying drawing, in which:

FIG. 1 is a flowchart of a video recording method according to an embodiment of the present disclosure.

DETAILED DESCRIPTION

Embodiments of the present disclosure are described in detail herein, examples of which are illustrated in the accompanying drawings. The reference numbers which are the same or similar throughout the accompanying drawings represent the same or similar elements or elements with the same or similar functions. The embodiments described below with reference to the accompanying drawings are illustrative for the purpose of explaining the present disclosure only and are not to be construed as limitations to the present disclosure.

In the self-created videos, a video production mode that two or more videos are spliced into the same video is more popular among the users. For example, the users take videos of themselves first, and then continue to record videos in the same pose after adjusting their own appearances, which seems instant dressing up with full of fun. However, it is difficult for the users who continue the recording to align the last pose of the previous video, which reduces the naturalness of the transition of the video. These videos are obviously not interesting enough, which gradually declines the interest of the netizens. As a result, it is difficult for the self-created videos to attract the netizens, thereby reducing the click-through rate of the self-created videos.

The present disclosure is intended to solve at least one of the above-mentioned technical defects, particularly the technical defect that alignment is difficult in the case of continuing video recording.

FIG. 1 is a flowchart of a video recording method according to an embodiment.

The present disclosure provides a video recording method. The video recording method is applied to a mobile terminal, and includes the following steps S100 to S400.

In step S100, a video is recorded in response to receipt of a record instruction (e.g., the user taps a record button), then the recording is paused in response to receipt of a pause instruction (e.g., the user taps a pause button), so that a first video file is generated. In some embodiments, the first video file may be a cache file recorded in a memory.

In some embodiments, the video is recorded immediately upon receipt of the record instruction input by the user. In some other embodiments, the video is recorded upon countdown to run out a first preset time, for example, 3 seconds, when the record instruction input by the user is received.

During recording the video, a recording progress component with a time mark, for example, a recording progress bar, may be displayed to display a recording progress in real time. The recording progress bar is provided with a time mark, such that the user can know the recording time of the video conveniently. The recording process bar is paused synchronously when the recording is paused upon receipt of the pause instruction input by the user.

In order to facilitate the user to position an image during continued recording, the recording may be paused upon receipt of the pause instruction input by the user, and simultaneously, first orientation data at the very moment (namely, time at which the recording is paused) is acquired. The first orientation data records a current orientation. In some embodiments, the first orientation data may be an inclination (of a terminal) captured, at the moment of pausing the recording, by an angular velocity sensor (gyroscope). In some other embodiments, the first orientation data may be a direction captured, at the moment of pausing the recording, by a magnetic sensor. During the continued recording, the user may be instructed to adjust an orientation, for example, an inclination or direction, of the terminal based on the first orientation data.

In some embodiments, the first orientation data captured at the moment of pausing the recording may be acquired and stored simultaneously.

In order to facilitate the user dissatisfied with the recorded video to re-record the video, in some embodiments, after the first video file is generated, the video may be re-recorded and the first video file is regenerated in response to receipt of a re-record instruction (e.g., the user taps a re-record button). The original first video file may be deleted or replaced with the regenerated first video file.

In some other embodiments, after the first video file is generated, the first video file may be deleted in response to receipt of a delete instruction (e.g., the user taps a delete button). Then, the video is re-recorded and the first video file is regenerated in response to the receipt of the re-record instruction (e.g., the user taps the record button again).

In some embodiments, an instruction of the user may be received to add animation special effect contents to the first video file to increase the interestingness of the video.

Step S200 is executed after the first video file is generated.

In step S200, a dynamic image captured, in real time, by an image sensor continues be displayed, and a last frame image of the first video file subjected to transparency processing is displayed on the dynamic image in a superimposition manner.

After the recording is paused, the image sensor may still capture the dynamic image but not store the dynamic image as a video file. For example, the image sensor of a mobile phone or a camera may be started to capture screen images in real time, but the screen images captured by the image sensors in real time may not be stored as pictures or video files until the user taps a shoot button or record button.

The terminal continues to display the dynamic image in real time, and the dynamic image is for the user to observe a scene to be recorded. During displaying the dynamic image, the last frame image may be displayed on the dynamic image in the superimposition manner. The last frame image is subjected to transparency processing. For example, the last frame image may be translucent, which is equivalent to that the dynamic image is covered with a translucent picture when it is displayed, such that the user may still see, through the translucent last frame image, the dynamic image that are being captured by the image sensor in real time. Thus, the user may conveniently position an image via the translucent last frame image during the continued recording. That is, the user may determine the start time for continued recording by comparing the dynamic image with the last frame image. Therefore, a transition between a first video and a second video may be more natural.

In some embodiments, before displaying the last frame image subjected to transparency processing, major elements in the image content of the last frame image may be outlined. For example, if the major element in the image content of the last frame image is a person image, the person image in the last frame image may be outlined, such that the user may position the image more conveniently.

In some embodiments, during displaying the last frame image on the dynamic image in the superimposition manner, a corresponding prompt may be generated according to a matching relationship between the first orientation data described above and a second orientation data detected in real time. For example, when a pose of the user holding the terminal does not match a pose of the user at the moment when the recording is paused, the current dynamic image naturally may not match the last frame image. Therefore, a matching degree or similarity between the dynamic image and the last frame image can be analyzed by comparing the first orientation data with the second orientation data, so as to prompt the user to make corresponding adjustments. For example, the user is prompted to incline in a certain direction or at a certain inclination angle, or the user is prompted to adjust the orientation of the terminal. When the first orientation data and the second orientation data are compared to determine that the dynamic image matches or is similar to the last frame image, the user may be prompted to continue the recording.

However, in some other embodiments, a corresponding prompt may be generated according to the similarity between any frame image of the dynamic image and the last frame image while displaying the last frame image on the dynamic image in the superimposition manner. That is, in these embodiments, the user is prompted by directly determining the matching degree or similarity between the dynamic image and the last frame image via image analysis, and the user may be prompted to continue the recording when the matching degree or similarity between the dynamic image (e.g., a certain frame) and the last frame image reaches a preset condition.

In step S300, the video continues to be displayed in response to receipt of a continue-to-record instruction (e.g., the user taps the record button again), then the recording is stopped in response to receipt of a stop instruction, so that a second video file is generated. Start time of the continue-to-record instruction for continued recording is determined by comparing the dynamic image with the last frame image. In some embodiments, the second video file may be a cache file recorded in a memory.

In some embodiments, the video is recorded as soon as the continue-to-record instruction input by the user is received. However, in some other embodiments, the video is recorded upon countdown to run out a second preset time, for example, 3 seconds, when the continue-to-record input by the user is received. During recording the video, a recording progress component with a time mark, for example, a recording progress bar, may be displayed to display the recording progress in real time.

Likewise, in order to facilitate the user dissatisfied with the recorded video to re-record, in some embodiments, after the second video file is generated, the video may be re-recorded and the second video file is regenerated in response to receipt of a re-record instruction (for example, the user taps a re-record button). The original second video file may be deleted or replaced with the regenerated second video file.

In some other embodiments, after the second video file is generated, the second video file may be deleted in response to receipt of a delete instruction (e.g., the user taps a delete button). Then, the video is re-recorded and the second video file is regenerated in response to the receipt of the re-record instruction (e.g., the user taps the record button again).

In some embodiments, an instruction of the user may be received to add animation special effect contents to the second video file to increase the interestingness of the video.

In step S400, the first video file and the second video file are spliced into a target video file. The target video file may be a cache file in a memory. The target video file is shared or is stored locally or in a cloud server when a share instruction or store instruction input by the user is received. The first video file and the second video file may be spliced into the target video file after a splice instruction input by the user is received, or, the first video file and the second video file may be automatically spliced into the target video file after step S300, which is not limited herein.

Certainly, after the target video file is generated, image processing may be performed on the target video file. For example, animation special effects may be added. Image signal processing includes but is not limited to at least one of the following operations: black reduction, lens roll-off correction, channel gain adjustment, defective pixel correction, demosaicing, cropping, scaling, white balance, color correction, brightness adaptation, color conversion and image contrast enhancement.

Alternatively, in order to accelerate or decelerate content playing of a first video or a second video of the target video file, in some embodiments, frame insertion or frame extraction processing may be performed on the first video file and/or the second video file before the first video file and the second video file are spliced into the target video file. Frame insertion processing may include inserting repeated frames into frames of the video, whereby the time span of the video is increased accordingly, and actions become slower in the view of the user. Frame extraction processing may include uniformly extracting and discarding some of the video frames (e.g., extracting odd-number or even-number frames), whereby the time span of the video is reduced accordingly, and the actions become faster in the view of the user.

Certainly, there also may be a case where multiple video files are generated after multiple recordings are performed. In this case, the multiple video files need to be spliced, which is not repeated herein.

In an embodiment, the present disclosure further provides a video recording terminal. The video recording terminal includes: one or more processors; a memory; and one or more applications stored in the memory and are configured to be executed by the one or more processors such that the one or more applications implement the video recording method according to any of the above embodiments.

An embodiment of the present disclosure also provides a mobile terminal. For the specific technical details not disclosed, reference can be made to the method embodiments of the present disclosure. The terminal may be any terminal device including a mobile phone, a tablet computer, a PDA, a Point of Sales (POS) machine, an onboard computer. The terminal being a mobile phone is taken as an example.

In the embodiments of the present disclosure, the processor included in the terminal may further implement the following functions: recording a video upon receipt of a record instruction input by a user, pausing the recording upon receipt of a pause instruction input by the user, and generating a first video file; continuing to display a dynamic image which is being captured by an image sensor in real time, and displaying a last frame image of the first video file subjected to transparency processing on the dynamic image in a superimposition manner; continuing to record the video upon receipt of a continue-to-record instruction input by the user, stopping the recording upon receipt of a stop instruction input by the user, and generating a second video file; and splicing the first video file and the second video file into a target video file. That is, the processor has the function of performing the video recording method of any of the above embodiments, which is not repeated herein.

According to the above video recording method and terminal, a video is recorded upon receipt of a record instruction input by a user; the recording is paused upon receipt of a pause instruction input by the user; and a first video file is generated. A dynamic image captured by an image sensor in real time continues to be displayed, and a last frame image of the first video file subjected to transparency processing is displayed on the dynamic image in a superimposition manner. The video continues to be recorded upon receipt of a continue-to-record instruction input by the user, then the recording is stopped upon receipt of a stop instruction input by the user, and a second video file is generated. The first video file and the second video file are spliced into a target video file. When the user continues to record the video, the user may position an image via the last frame image retained when the first video is recorded therebefore, such that a subsequently recorded second video may join well with the previously recorded first video, thereby realizing a continued-to-record function for an incomplete video. As a result, the transition of the finally spliced target video is more natural, increasing the interest in self-created videos, and thus increasing the click-through rate of a self-created video.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include a plurality of sub-steps or a plurality of stages, which are not necessarily performed at the same time, but may be executed at different time. The execution order thereof is also not necessarily performed sequentially, but may be performed alternately with at least a portion of other steps or sub-steps or stages of other steps.

Described above are some embodiments of the present disclosure, and it should be noted that those of ordinary skill in the art may also make several improvements and modifications without departing from the principles of the present disclosure which should be considered as the scope of protection of the present disclosure.

What is claimed is:

1. A video recording method, comprising following steps:
    recording a video in response to receipt of a record instruction, pausing the recording in response to receipt of a pause instruction, so as to generate a first video file;
    continuing to display a dynamic image which is being captured by an image sensor in real time, and displaying a last frame image of the first video file subjected to transparency processing on the dynamic image in a superimposition manner;
    continuing to record the video in response to receipt of a continue-to-record instruction, stopping the recording in response to receipt of a stop instruction, so as to generate a second video file; wherein start time of the continue-to-record instruction for continued recording is determined by comparing the dynamic image with the last frame image; and
    splicing the first video file and the second video file into a target video file.

2. The method according to claim 1, wherein the method further comprises: acquiring first orientation data at a moment of pausing the recording; and
    generating a corresponding prompt according to a matching relationship between the first orientation data and second orientation data detected in real time.

3. The method according to claim 1, wherein the method further comprises: generating a corresponding prompt according to similarity between any frame image of the dynamic image and the last frame image.

4. The method according to claim 1, wherein before splicing the first video file and the second video file into the target video file, the method further comprises: adding an animation special effect into the first video file.

5. The method according to claim 1, wherein before splicing the first video file and the second video file into the target video file, the method further comprises: performing frame insertion processing on the first video file.

6. The method according to claim 1, wherein before displaying the last frame image subjected to transparency processing, the method further comprises: outlining major elements in image contents of the last frame image.

7. The method according to claim 1, wherein the video is recorded upon countdown to run out a first preset time upon receipt of the record instruction input by the user.

8. The method according to claim 1, wherein a recording progress component with a time mark is displayed during recording the video.

9. The method according to claim 1, wherein after generating the first video file, the video is re-recorded and the first video file is regenerated in response to receipt of a re-record instruction.

10. A video recording terminal, comprising:
a display;
one or more processors;
a memory; and
one or more applications stored in the memory, and configured to be executed by the one or more processors and to perform:
recording a video in response to receipt of a record instruction, pausing the recording in response to receipt of a pause instruction, so as to generate a first video file;
continuing to display a dynamic image which is being captured by an image sensor in real time, and displaying a last frame image of the first video file subjected to transparency processing on the dynamic image in a superimposition manner;
continuing to record the video in response to receipt of a continue-to-record instruction, stopping the recording in response to receipt of a stop instruction, so as to generate a second video file; wherein start time of the continue-to-record instruction for continued recording is determined by comparing the dynamic image with the last frame image; and
splicing the first video file and the second video file into a target video file.

11. The terminal according to claim 10, wherein the one or more processors further performs:
acquiring first orientation data at a moment of pausing the recording; and
generating a corresponding prompt according to a matching relationship between the first orientation data and second orientation data detected in real time.

12. The terminal according to claim 10, wherein the one or more processors further performs:
generating a corresponding prompt according to similarity between any frame image of the dynamic image and the last frame image.

13. The method according to claim 2, wherein acquiring the first orientation data at the moment of pausing the recording comprises:
acquiring an inclination captured, at the moment of pausing the recording, by an angular velocity sensor.

14. The method according to claim 2, wherein acquiring the first orientation data at the moment of pausing the recording comprises:
acquiring a direction captured, at the moment of pausing the recording, by a magnetic sensor.

15. The method according to claim 1, wherein before splicing the first video file and the second video file into the target video file, the method further comprises: adding an animation special effect into the second video file.

16. The method according to claim 1, wherein before splicing the first video file and the second video file into the target video file, the method further comprises: performing frame extraction processing on the first video file.

17. The method according to claim 1, wherein before splicing the first video file and the second video file into the target video file, the method further comprises: performing frame insertion processing on the second video file.

18. The method according to claim 1, wherein before splicing the first video file and the second video file into the target video file, the method further comprises: performing frame extraction processing on the second video file.

19. The method according to claim 1, wherein recoding of the video is continued upon countdown to run out a second preset time upon receipt of the continue-to-record instruction input by the user.

20. The method according to claim 1, wherein after generating the second video file, the video is re-recorded and the second video file is regenerated in response to receipt of the re-record instruction.

* * * * *